(12) United States Patent
You et al.

(10) Patent No.: US 11,833,742 B2
(45) Date of Patent: Dec. 5, 2023

(54) HIGH-FIDELITY 3D PRINTING USING FLASHING PHOTOPOLYMERIZATION

(71) Applicant: THE REGENTS OF THE UNIVERSITY OF CALIFORNIA, Oakland, CA (US)

(72) Inventors: Shangting You, La Jolla, CA (US); Shaochen Chen, San Diego, CA (US)

(73) Assignee: The Regents of the University of California, Oakland, CA (US)

(*) Notice: Subject to any disclaimer, the term of this patent is extended or adjusted under 35 U.S.C. 154(b) by 151 days.

(21) Appl. No.: 17/360,891

(22) Filed: Jun. 28, 2021

(65) Prior Publication Data
US 2021/0402678 A1    Dec. 30, 2021

Related U.S. Application Data

(60) Provisional application No. 63/044,824, filed on Jun. 26, 2020.

(51) Int. Cl.
| | |
|---|---|
| *B29C 64/129* | (2017.01) |
| *B29C 64/245* | (2017.01) |
| *B29C 64/286* | (2017.01) |
| *B33Y 30/00* | (2015.01) |
| *B29C 64/232* | (2017.01) |
| *B33Y 10/00* | (2015.01) |
| *B29C 64/273* | (2017.01) |

(52) U.S. Cl.
CPC .......... *B29C 64/129* (2017.08); *B29C 64/232* (2017.08); *B29C 64/245* (2017.08); *B29C 64/273* (2017.08); *B29C 64/286* (2017.08); *B33Y 10/00* (2014.12); *B33Y 30/00* (2014.12)

(58) Field of Classification Search
CPC ... B29C 64/129; B29C 64/232; B29C 64/245; B29C 64/286; B29C 64/273; B33Y 10/00; B33Y 30/00

USPC .......................................................... 264/401
See application file for complete search history.

(56) References Cited

U.S. PATENT DOCUMENTS

| | | | |
|---|---|---|---|
| 3,943,046 | A | 3/1976 | Sorga et al. |
| 4,961,154 | A | 10/1990 | Pomerantz et al. |
| 5,545,367 | A | 8/1996 | Bae et al. |
| 8,444,899 | B2 | 5/2013 | DeSimone et al. |
| 9,631,171 | B2 | 4/2017 | Soman et al. |

(Continued)

FOREIGN PATENT DOCUMENTS

WO    2014074954 A3    1/2015

OTHER PUBLICATIONS

EP15795499.1 Extended European Search Report dated Dec. 22, 2017, 7 pgs.
Feng, X, et al. Visualization of Dynamic Trafficking of a Protein Kinase C βII/Green Fluorescent Protein Conjugate Reveals Differences in G Protein-coupled Receptor Activation and Desensitization, Journal of Biological Chemistry, vol. 273, No. 17, Apr. 24, 1998, 10755-10762.

(Continued)

*Primary Examiner* — Joseph S Del Sole
*Assistant Examiner* — Lawrence D. Hohenbrink, Jr.
(74) *Attorney, Agent, or Firm* — Eleanor Musick; Torrey Pines Law Group, PC

(57) ABSTRACT

A method and system for microscale 3D printing achieve high-fidelity fabrication through the control of the light exposure time. A single pulse of light is used to initiate polymerization of a pre-polymer solution to minimize scattering-induced resolution deterioration. The printed object is fabricated in a layer-by-layer construction where each layer is formed through exposure to a single light pulse.

28 Claims, 9 Drawing Sheets

(56) References Cited

U.S. PATENT DOCUMENTS

| | | |
|---|---|---|
| 10,351,819 B2 | 7/2019 | Hribar et al. |
| 10,464,307 B2 | 11/2019 | Chung et al. |
| 10,954,489 B2 | 3/2021 | Qu et al. |
| 2003/0052105 A1 | 3/2003 | Nagano et al. |
| 2004/0023434 A1 | 2/2004 | Venkatesan et al. |
| 2005/0234513 A1 | 10/2005 | Alexander et al. |
| 2005/0259785 A1 | 11/2005 | Zhang |
| 2006/0069230 A1 | 3/2006 | Papisov |
| 2006/0100734 A1 | 5/2006 | Huang et al. |
| 2006/0267997 A1 | 11/2006 | Walls et al. |
| 2006/0267998 A1 | 11/2006 | Walls et al. |
| 2007/0259156 A1 | 11/2007 | Kempers et al. |
| 2007/0292837 A1 | 12/2007 | Deutsch et al. |
| 2009/0233359 A1 | 9/2009 | Kwon |
| 2011/0033887 A1 | 2/2011 | Fang et al. |
| 2011/0260365 A1 | 10/2011 | El-Siblani |
| 2012/0241740 A1 | 9/2012 | Park et al. |
| 2013/0044300 A1 | 2/2013 | Mei et al. |
| 2013/0123988 A1 | 5/2013 | Jariwala et al. |
| 2013/0295212 A1 | 11/2013 | Chen et al. |
| 2013/0344601 A1 | 12/2013 | Soman et al. |
| 2016/0046072 A1 | 2/2016 | Rolland et al. |
| 2016/0221262 A1* | 8/2016 | Das ........................ B29C 64/393 |
| 2016/0298087 A1 | 10/2016 | Qu et al. |
| 2018/0009163 A1* | 1/2018 | Craven ................ B29C 64/129 |
| 2022/0025322 A1* | 1/2022 | Matheu ................ A61L 31/125 |

OTHER PUBLICATIONS

Grogan, S.P. et al., Digital micromirror device projection printing system for meniscus tissue engineering; Acta Biomaterialia 9 (2013), pp. 7218-7226.

Han, L-H, et al., Fabrication of three-dimensional scaffolds for heterogeneous tissue engineering, Biomed Microdevices, Springer Science+Business Media LLC 2010, DOI 10.1007/s1054-010-9425-2.

Han, L-H, et al., Projection Microfabrication of Three-Dimensional Scaffolds for Tissue Engineering, Journal of Manufacturing Science and Engineering, Apr. 2008, vol. 130 / 021005-1, 4 pgs.

Hribar, K.C. et al., Light-assisted direct-write of 3D functional biomaterials; Lab Chip, 2014, 14, 268-275.

PCT/US2015/031848, International Search Report and Written Opinion, dated Aug. 5, 2015, 12 pages.

Soman et al., Digital microfabrication of user-defined 3D microstructures in cell-laden hydrogels, Jun. 3, 2013, Biotechnol Bioeng, 110(11): 3038-3047.

Suri, S., et al., "Solid freeform fabrication of designer scaffolds of hyaluronic acid for nerve tissue engineering", Biomedical Microdevices, 2011, vol. 13(6), pp. 983-993.

Zhang, A.P. et al., Rapid Fabrication of Complex 3D Extracellular Microenvironments by Dynamic Optical Projection Stereolithography, Adv. Mater. 2012, 24 4266-4270.

\* cited by examiner

HIGH-FIDELITY 3D PRINTING USING FLASHING PHOTOPOLYMERIZATION

RELATED APPLICATIONS

This application claims the benefit of the priority of Provisional Application No. 63/044,824, filed Jun. 26, 2020, which is incorporated herein by reference in its entirety.

GOVERNMENT RIGHTS

This invention was made with government support under Grants No. EB021857 and HD090662 awarded by the National Institutes of Health and Grant No. CMMI1644967 awarded by the National Science Foundation. The government has certain rights in the invention.

FIELD OF THE INVENTION

The present invention relates to a micro-scale 3D printing method to achieve high-fidelity fabrication through the control of the light exposure time, and more particularly to use of a short pulse light source to minimize loss of resolution caused by scattering.

BACKGROUND

Photopolymerization-based 3D printing techniques are powerful tools in 3D freeform structure fabrication. They are able to fabricate micro- and nano-scale complex-geometry structures that are difficult to achieve using traditional fabrication methods such as machining and molding. Among various types of photopolymerization-based 3D printing techniques, light-projection-based 3D printing such as continuous liquid interface production (CLIP), projection micro-stereolithography (PµSL), and dynamic optical projection stereolithography (DOPsL) employ a digital light processing (DLP) technique to project arbitrary patterns onto the prepolymer, achieving both a fine resolution and rapid fabrication. These approaches have opened up possibilities for application to consumer products as well as biomedical engineering such as implantation, imaging, tissue culture, drug delivery and more. Despite these successful demonstrations of 3D polymeric structure fabrication, this technique faces a significant challenge to fabricate functional devices that require precisely-dimensioned microstructures using materials that are not optimized for fabrication. For example, the water-containing hydrogel scaffolds used in biomedical applications require a complex 3D architecture with micron-scale features in order to capture the dynamic interactions between the cells and microenvironment. The challenge lies in the fact that most hydrogel materials cannot be fabricated at a very fine resolution.

In order to print functional devices with a high precision, the exposure dose must be tightly controlled. Underexposure leads to incomplete photopolymerization of the material, while overexposure can lead to polymerization beyond the desired region. Generally, the window of proper exposure dose is narrow, and a proper exposure dose needs to be identified for each print. This optimization process involves a significant amount of trial-and-error, making it both time-consuming and costly. In addition, the fabrication resolution is rarely as good as the printer's optical resolution.

The described resolution deterioration is primarily caused by three factors: light scattering, focal depth and molecular diffusion. First, even though a sharp pattern may be formed in a clear media, it is inevitably blurred in a scattering medium. The second factor is optical depth of focus. Light can penetrate and polymerize within a certain thickness. If the polymerization thickness is greater than the optical depth of field, the out-of-focus plane is also polymerized. The third effect is molecular diffusion. Although free radicals are only generated within the light illuminated region, free radicals and propagating chains can diffuse out of the light illuminated area and cause polymerization. While these factors may be negligible in fabrication of a macro device, they have substantial impact on microstructure fabrication.

Among the three factors, light scattering was determined to be dominant. Note that the prepolymer induces minimal scattering as long as it is a homogeneous solution. Once the material begins to polymerize, scattering increases. Thus, light exposure should be avoided as scattering increases. The challenge lies in the fact that current light-projection-based 3D printing techniques employ a continuous wave (CW) light source such as a mercury lamp, laser, or light emitting diode (LED) to photopolymerize the prepolymer solution. In such processes, the light exposure, polymerization propagation, and increased scattering (opacification) overlap during the printing process. As a result, light scattering and polymerization beyond the desired target region are inevitable, resulting in low fidelity printing.

Of the multistep free-radical photopolymerization process, light exposure conditions only affect free radical generation. The propagation of polymerizing chains may continue to occur under dark conditions following exposure to light. Scherzer et. al. (*Vibrational Spectroscopy*, 1999) used real-time Fourier-transform infrared (FTIR) spectroscopy to investigate the photopolymerization process of tripropylene glycol diacrylate (TPGDA) and found that chain propagation continues to proceed a few seconds after a short (~100 ms) and intense exposure, ultimately reaching a conversion rate similar to that occurring with a CW exposure. Only a small fraction of monomers was consumed during the exposure period—the majority was consumed during the dark period.

BRIEF SUMMARY

According to embodiments of the present invention, the poor resolution that results from light scattering in existing photopolymerization techniques is overcome through the use of flashing photopolymerization ("FPP"). During the FPP's millisecond exposure period, minimal scattering occurs within the prepolymer. Rather than waiting for the bulk of the polymerization to occur during exposure, the material polymerizes and opacifies in the absence of light so that the exposure pattern is not perturbed by scattering.

In the inventive FPP 3D printing scheme, a 3D model is sliced into a series of 2D images. The supporting platform is lowered to maintain a narrow spacing (typically between 10 and 100 microns) between the supporting platform and the anti-adhesion substrate. A xenon flash tube is controlled by a computer controller to flash at a specified energy for a predetermined period of time. After flash exposure, the first layer is solidified and attached to the supporting platform. The motorized stage then raises the supporting platform by one layer thickness (typically between 10 to 100 microns) so that unpolymerized material refills the spacing between the substrate and the previous layer. A new image slice is loaded on the DMD and the flash tube is activated to flash to initiate solidification of the new layer. The computer controller synchronizes the flashing and the stage motion. By repeating these steps, a 3D object can be printed in a layer-by-layer manner, with each layer being formed through exposure to a single flash.

According to an exemplary embodiment, a light-projection-based 3D printing system uses flashing exposure for photopolymerization. The inventive approach chronologically manages the order of the three events: light exposure, polymerization, and opacification. First, the flash exposure acts to generate a large number of free radicals. Next, the prepolymer solution undergoes polymerization and opacification in the absence of light. Thus, the prepolymer is exposed to light only when there is minimal scattering within the material, so that scattering-induced resolution impact is minimized. Compared to the use of a CW light source, the FPP fabrication resolution is greatly improved, demonstrating little dependency on the exposure dose.

In one aspect of the invention, a method for micro-scale 3D printing of an object includes providing a 3D printer having an optical pathway configured for projecting modulated photopolymerizing light from a pulsed light source into a pre-polymer solution within a printing volume defined between a substrate and a movable platform disposed within the solution; activating the pulsed light source to emit a single flash of polymerizing energy into the optical pathway to polymerize solution within the printing volume to print a first layer of the object; moving the platform to define a new printing volume and activating the pulsed light source to emit another single flash of polymerizing energy to polymerize solution within the new printing volume to print a next layer of the object; and repeating the step of moving the platform and activating the pulsed light source for a plurality of iterations to form a plurality of layers, wherein each iteration generates a single layer, so that the object is fabricated layer-by-layer until finished. In some embodiments, the 3D printer comprises a digital micro-mirror device (DMD) configured to modulate the photopolymerizing light with a photomask image corresponding to each layer of the object. The printing volume may have a thickness within a range of from 1 and 500 microns. The substrate may be a transparent anti-adhesion substrate through which the photopolymerizing light is projected. The pulsed light source may be a flash tube or a pulsed laser. In some embodiments, the platform may be moved by incrementally separating the substrate and the platform by a separation of from 1 and 500 microns. In other embodiments, the platform moves continuously to separate the substrate and the platform, where the pulsed light source is activated at each separation of from 1 and 500 microns. In some embodiments, the single flash has a flash duration in the range of 1 femtosecond to 50 ms. The single flash has a flash duration configured to avoid light scattering within the solution. The flashes have a peak power from 20 W to $10^{15}$ W.

In another aspect of the invention, a method for micro-scale 3D printing of an object includes using a first photomask to modulate a first flash of light from a polymerizing light source projected along an optical path to photopolymerize a first volume of pre-polymer solution to form a first layer of the object on a platform disposed within the solution, wherein the first volume is defined between a transparent substrate and the platform; moving the platform away from the transparent substrate to define a second volume of pre-polymer solution; in response to movement of the platform by a predetermined distance, modulating a second flash of light with a second photomask to photopolymerize the second volume to form a second layer of the object; and repeating the steps of moving and modulating with each of a plurality of additional photomasks to form a plurality of additional layers to construct the object layer-by-layer until finished. Movement of the platform may be continuous or incremented, where the second flash is initiated when the platform has moved the predetermined distance, which may be from 1 and 500 microns. In some embodiments, the 3D printer comprises a digital micromirror device (DMD) configured to modulate the photopolymerizing light with a photomask image corresponding to each layer of the object. The printing volume may have a thickness within a range of from 1 and 500 microns. The substrate may be a transparent anti-adhesion substrate through which the photopolymerizing light is projected. The pulsed light source may be a flash tube or a pulsed laser. A single flash may have a flash duration in the range of 1 femtosecond to 50 ms. The single flash has a flash duration configured to avoid light scattering within the solution. The flashes have a peak power from 20 W to $10^{15}$ W.

In another aspect of the invention, a micro-scale 3D printer for printing an object, includes: a container configured to retaining a pre-polymer solution, the container having a transparent substrate; a movable platform disposed within the solution and separated from the substrate by a separation, wherein the separation defines a printing volume; a pulsed light source configured to project a flash of photopolymerizing light along an optical path toward the printing volume; a light modulator configured for modulating the photopolymerizing light with a series of photomasks corresponding to layers of the object; and a control unit configured for: activating the pulsed light source to emit a single flash to polymerize a first layer of the object; moving the movable platform to increase the separation by a predetermined spacing; activating the pulsed light to emit another single flash to polymerize a next layer of the object; repeating the moving and activating for a plurality of iterations to print a plurality of layers corresponding to the series of photomasks until the object is finished. In some embodiments, the 3D printer comprises a digital micromirror device (DMD) configured to modulate the photopolymerizing light with a photomask image corresponding to each layer of the object. The printing volume may have a thickness within a range of from 1 and 500 microns. The substrate may be a transparent anti-adhesion substrate through which the photopolymerizing light is projected. The pulsed light source may be a flash tube or a pulsed laser. A single flash may have a flash duration in the range of 1 femtosecond to 50 ms. The single flash has a flash duration configured to avoid light scattering within the solution. The flashes have a peak power from 20 W to $10^{15}$ W.

The inventive process and system is useful for any field that requires high resolution 3D fabrication at micron scale, including, but not limited to, microelectromechanical systems (MEMS), microfluidics, tissue engineering, and biomedical devices.

BRIEF DESCRIPTION OF THE DRAWINGS

FIG. 1B is a SEM image of a micro "altar" printed with 100 μm layer thickness; and FIG. 1C is a SEM image of a micro "apple" printed with 20 μm layer thickness.

FIG. 2A shows patterns printed with CW exposure at different relative energies; FIG. 2B shows patterns printed with flashing exposure at different relative energies, and FIG. 2C plots the relation between the relative energy and unresolved fraction.

FIGS. 4A and 4C show images of Tyndall effect at different time point of CW and flashing exposure, respectively; FIGS. 4B and 4D plot the intensity profiles of the light at the different time points in FIGS. 4A and 4C; FIG. 4E is the FTIR spectrum of pure PEGDA (Mn=575), dehydrated PEGDA slab polymerized with flashing exposure, and dehydrated PEGDA slab polymerized by CW exposure; and FIG. 4F shows the scattering coefficient of PEGDA prepolymer solution, PEGDA slab polymerized with flashing exposure, and PEGDA slab polymerized by CW exposure.

FIG. 6A is the macroscopic image, the upper-left disc is made by CW exposure, and the lower-right disc is made by flashing exposure; FIGS. 6B and 6C are SEM micrographs of samples polymerized using CW and flashing exposures, respectively.

DETAILED DESCRIPTION OF EMBODIMENTS OF THE INVENTION

Figure 1A:
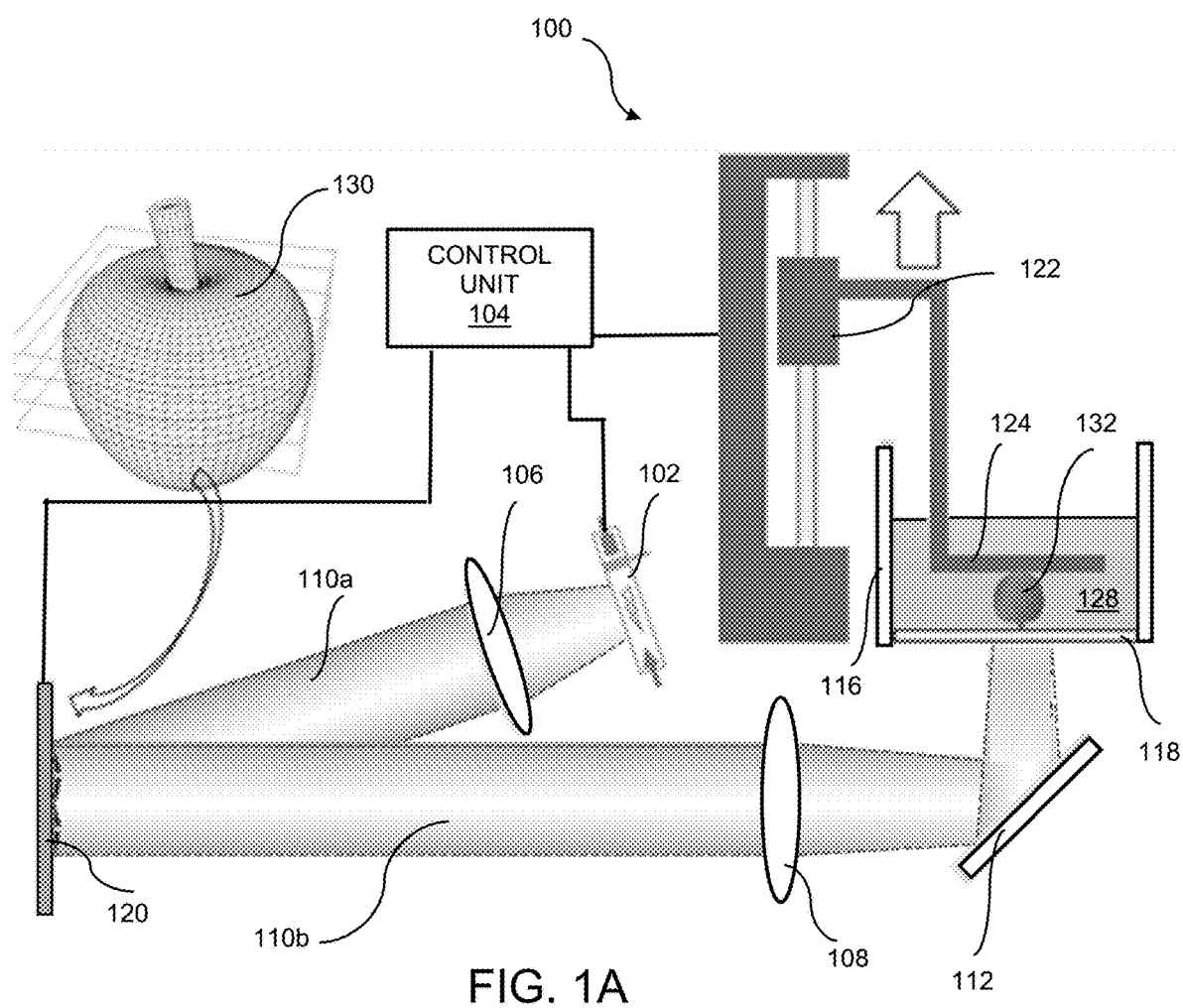
FIG. 1A is a schematic of an embodiment of the inventive FPP 3D printing system.

An embodiment of a printer for performing the inventive method for high fidelity 3D printing by flashing photopolymerization, i.e., "FPP 3D", is shown in the schematic of FIG. 1A. The printer 100 uses a xenon flash tube 102 as the light source, which is connected to an electrical control unit 104. The light is projected along optical pathway 110a through optical lens 106 (or a lens assembly) to a digital micro-mirror device (DMD) 120 which modulates the light with the photomask image, represented by sample image 130, which, in the illustrated example, is an apple. Modulated light follows the optical path 110b through lens (or lens assembly) 108 for projection onto the transparent anti-adhesion substrate 118. As illustrated, optical path 110b is directed to substrate 118 by mirror 112. A motorized stage 122 is used to control the motion of the sample supporting platform 124. Control unit 104 controls and synchronizes activation of flash tube 102, manipulation of DMD 120 to project the appropriate photomask layer, and to increment the motorized stage 122 to raise platform 124 for each layer. The printed object 132 is fabricated on substrate 118 layer-by-layer. Additional details for an exemplary photopolymerization set-up that uses a DMD can be found in U.S. Pat. No. 10,464,307, which is incorporated herein by reference.

Still referring to FIG. 1A, the 3D printing process is described as follows: a 3D model, e.g., apple 130, is sliced into 2D images. The supporting platform 124 is lowered into a container 116 of pre-polymer solution 128 to maintain a very narrow spacing (typically between 10 to 100 microns) between the supporting platform 124 and the anti-adhesion substrate 118. The xenon flash tube 102 is controlled to flash at a specified energy. An appropriate energy range will less than or equal to 100 J. Examples are described in which energies of 20 J and 40 J are used. After the exposure, first layer is solidified and attached to the supporting platform 124. The motorized stage 122 then raises the supporting platform 124 by one layer thickness (typically between 10 to 100 microns) so that unpolymerized material 128 refills the spacing between the substrate 118 and the previous layer. A new image slice is loaded on the DMD 120, and the flash tube 102 flashes to solidify this new layer. By repeating these steps, a 3D object can be printed in a layer-by-layer manner. It is important to observe the limitation that each layer is to be fabricated by a single flash only. Multiple flashes during formation of a single layer are to be avoided due to the reduction in resolution caused by scattering. It should also be noted that while the method employs one exposure flash per layer, the motion of the stage 122 need not be stepped or stopped to separately and individually expose each layer before moving the stage for the next layer. In some embodiments, the stage motion can be slow and continuous, with the speed of the motion being controlled by control unit 104 in coordination with the timing of the flashes. Thus, in a continuous movement approach, when the increased separation between the stage and the platform reaches the predetermined separation for a layer, the control unit activates a flash to form the layer. Thus, a layer is formed when the desired layer thickness has been achieved through the stage motion.

For testing, PEGDA (Mn=575) was purchased from Sigma-Aldrich. Irgacure 784 was purchased from Ciba Specialty Chemicals (now BASF). LAP was synthesized in-lab following the published method described by Fairbanks, et al. (2009). The flash tube was purchased from Xenon Flash Tubes.

Figure 1B:
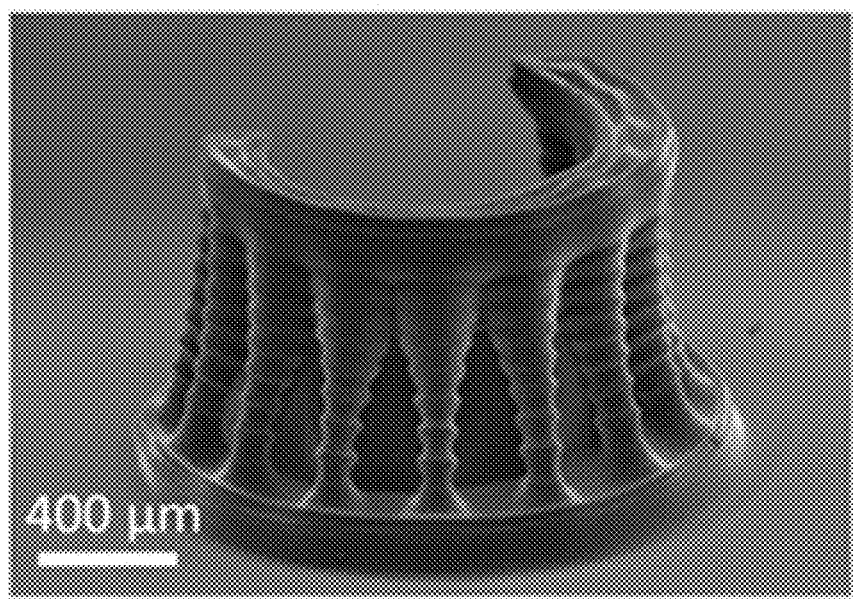
FIGS. 1B and 1C are photomicrographs of products of flashing photopolymerization 3D printing, where
Figure 1C:
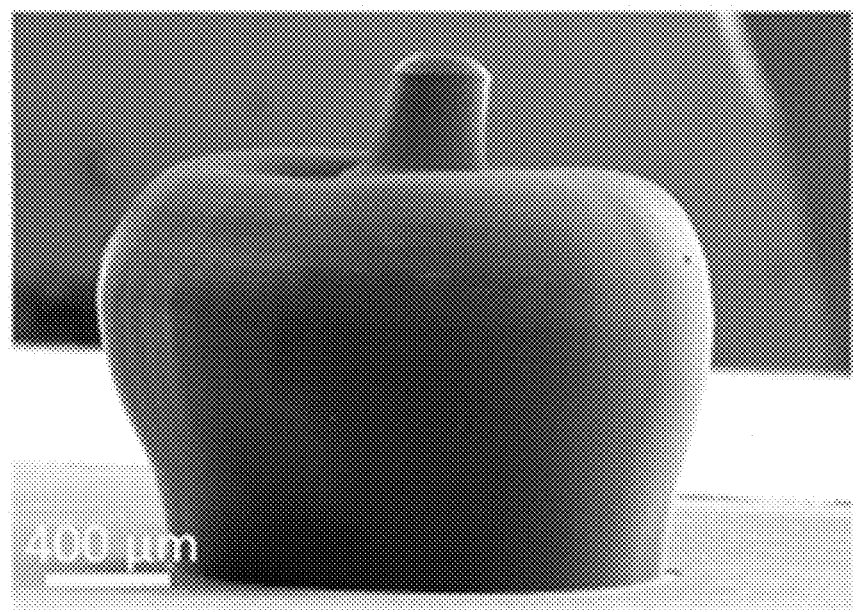

The overall printing speed and quality depend on the layer thickness. A smaller layer thickness results in better fabrication quality while a coarser layer thickness takes less time to fabricate. Two sample structures were 3D-printed using a pre-polymer solution of 100% poly(ethylene glycol) diacrylate (PEGDA, Mn=575) and 4% (w/v) Irgacure 784. FIG. 1B is a scanning electron microscope (SEM) image of a complex structure printed using a sequence of steps, each of which formed a 100-μm thickness layer. FIG. 1C is an SEM image of a structure (corresponding to apple 130) printed using 20-μm-thickness layer steps, generating a much smoother resulting surface.

To compare the resolution differences between the FPP and CW (continuous wave) printing modes, we designed a spoke pattern for resolution test. This pattern was 3D printed with a UV LED (CW light) or a xenon flash tube (flashing light). The structure consists of a single 250-μm thick layer. Different exposure doses were used to polymerize the structure. For the CW UV LED, a series of different output powers were used keeping the same illumination time. For the flash tube, a series of different total energies were used in a single flash. The prepolymer solution contains 50% (v/v) PEGDA mixed with 4% (w/v) lithium phenyl-2,4,6-trimethylbenzoylphosphinate (LAP) as the photoinitiator in aqueous solution.

The spoked pattern test structure was selected because it was expected that the outer circumference of the pattern would be well resolved while the center may be difficult to resolve. It was also expected that a higher exposure dose could lead to a larger unresolved area. Resolution is evaluated by unresolved fraction, which is the ratio between the unresolved diameter and the outer diameter of the spoke. A smaller unresolved fraction means a better resolution.

A series of LED (CW) output powers and a series of flash energies were used to polymerize the material. At a low exposure dose, the material is unable to polymerize. As the energy increases, at a certain value, the spoke can be printed—this value is marked as a "unit exposure dose". Note that the unit exposure dose represents different energies in the flashing mode and CW mode because they are significantly different in the duration time and spectrum. A relative exposure dose $E_r$ is defined as the ratio between the actual exposure energy and the unit exposure dose. We used $E_r=1$, $E_r=1.26$, $E_r=1.59$, $E_r=2$, $E_r=2.52$, $E_r=3.18$, and $E_r=4$ to polymerize the material in the CW mode and flashing mode, respectively, then assessed the unresolved fraction.

Figure 2A:
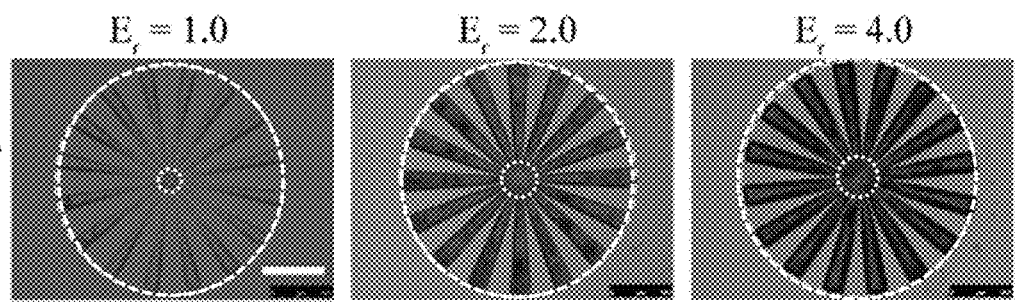
FIGS. 2A-2C show results of a resolution test for CW exposure mode and flashing exposure mode, where
Figure 2B:
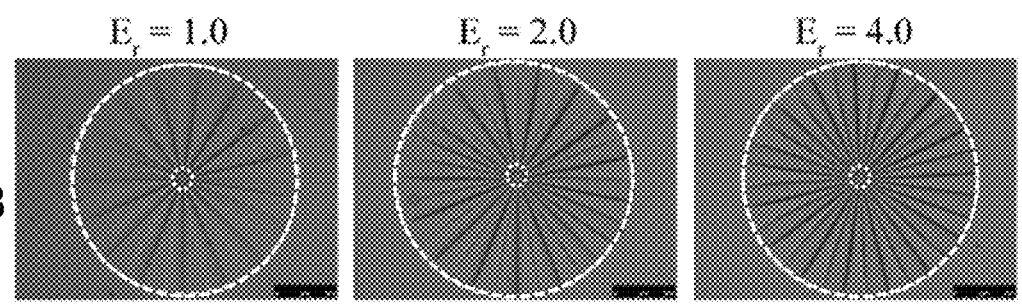

Bright-field microscopic images are shown in FIG. 2A for the CW exposure mode and in FIG. 2B for the flashing exposure mode. The outer diameter (outer dashed circle) of the spoke pattern is 1.9 mm. The unresolved diameter (inner dashed circle) is less than 0.4 mm for all samples. The scale bar=500 micron.

Figure 2C:
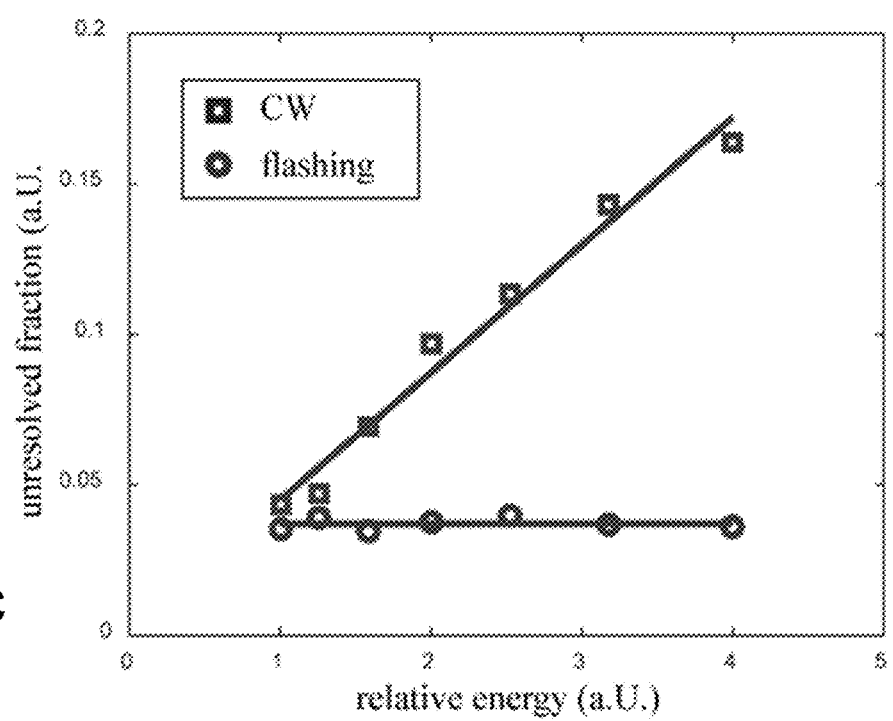

The relation between the exposure energy and unresolved fraction is plotted in FIG. 2C. A first observation is that the flashing exposure mode always provided a better resolution than the CW mode. For the CW exposure mode, it is clear that the unresolved fraction is strongly dependent on the exposure dose. However, for the flashing exposure mode, the unresolved fraction is insensitive to the exposure energy. Therefore, by using a flashing light source, the fabrication resolution becomes finer, and the tolerance window of exposure dose is broadened.

The free-radical photopolymerization process can be divided into three stages. The first stage is photoinitiation. When exposed to light, the photoinitiator molecule is homolytically cleaved into two free-radicals. Free radicals react with monomers and become active propagating chains. The second stage is propagation. The propagating chains continue to react with monomers and grow longer. The third stage is termination. An active chain stops propagating when combined with a free-radical or another propagating chain.

The initiation rate is proportional to the photoinitiator quantum yield $\Phi$ and photon absorption quantity per unit volume per unit time $N_{abs}$. The reaction rate of chain propagation $r_p$ is proportional to monomer concentration [M], propagating chain concentration [P*], and chain propagation kinetic constant $k_p$. The reaction rate of chain termination is proportional to the square of propagating chain concentration [P*] and chain termination kinetic constant $k_t$. The initiation rate, propagation rate and termination rate are given by Equations (1)-(3).

$$r_i = 2\Phi N_{abs} \tag{1}$$

$$r_p = k_p[M][P^*] \tag{2}$$

$$r_t = k_t[P^*]^2 \tag{3}$$

The change of monomer concentration and propagating chain concentration are given by Equations (4), (5).

$$\frac{\partial [M]}{\partial t} = -r_p \tag{4}$$

$$\frac{\partial [P^*]}{\partial t} = r_i - r_t \tag{5}$$

As the prepolymer solution becomes more viscous, both the propagation kinetic constant and termination kinetic constant decrease during polymerization reaction. According to a well-established diffusion-controlled free-radical polymerization model, both kinetic parameters can be determined by Equations (6), (7), $$k_p = \frac{k_{p0}}{1 + e^{A_p(1/f - 1/f_{cp})}} \tag{6}$$

$$k_t = \frac{k_{t0}}{1 + \left(\frac{Rk_p[M]}{k_{t0}} + e^{-A_t(1/f - 1/f_{ct})}\right)^{-1}} \tag{7}$$

where $k_{p0}$, $k_{t0}$ are the propagation and termination kinetic constants when there is no diffusion limit; f is the fractional free volume of the system; $f_{cp}$ and $f_{ct}$ are the critical fractional free volume for propagation and termination, respectively, at which the propagation or termination constant will drop by half; $A_p$ is a parameter reflecting the effect of diffusion limit on kinetic constant; R is the reaction-diffusion parameter.

The fractional free volume of the system is related to the monomer conversion rate, as Equations (8)-(12), $$f = f_m \phi_m + f_p(1 - \phi_m) \tag{8}$$

$$\phi_m = \frac{1-X}{1 - X + \frac{\rho_m}{\rho_p} X} \tag{9}$$

$$X = ([M]_0 - [M])/[M]_0 \tag{10}$$

$$f_m = 0.025 + \alpha_m(T - T_{gm}) \tag{11}$$

$$f_p = 0.025 + \alpha_p(T - T_{gp}) \tag{12}$$

where T is the system temperature; $T_{gm}$ and $T_{gp}$ are the glass transition temperatures of the monomer and polymer; $\alpha_m$ and $\alpha_p$ are the thermal expansion coefficients of monomer and polymer; $\rho_m$ and $\rho_p$ are the densities of the monomer and polymer; $[M_0]$ is the initial monomer concentration; X is the monomer conversion rate; $\phi_m$ is the volume fraction of the monomer; $f_m$ and $f_p$ are the fractional free volume of pure monomer and pure polymer.

The material properties and kinetic constants of DEGDMA are: $\rho_m=1.061$ g·cm$^{-3}$, $\rho_p=1.32$ g·cm$^{-3}$, $[M_0]=8.7$ mol·L$^{-1}$, $T_{gm}=-100°$ C., $T_{gp}=225°$ C., $\alpha_m=0.0005°$ C.$^{-1}$, $\alpha_p=0.000075°$ C.$^{-1}$, R=2, $k_{p0}=200$ L·mol$^{-1}$·s$^{-1}$, $k_{t0}=80000$ L·mol$^{-1}$·s$^{-1}$, $A_p=1.2$, $A_t=2.7$, $f_{cp}=0.062$, $f_{ct}=0.089$.

Figure 3A:
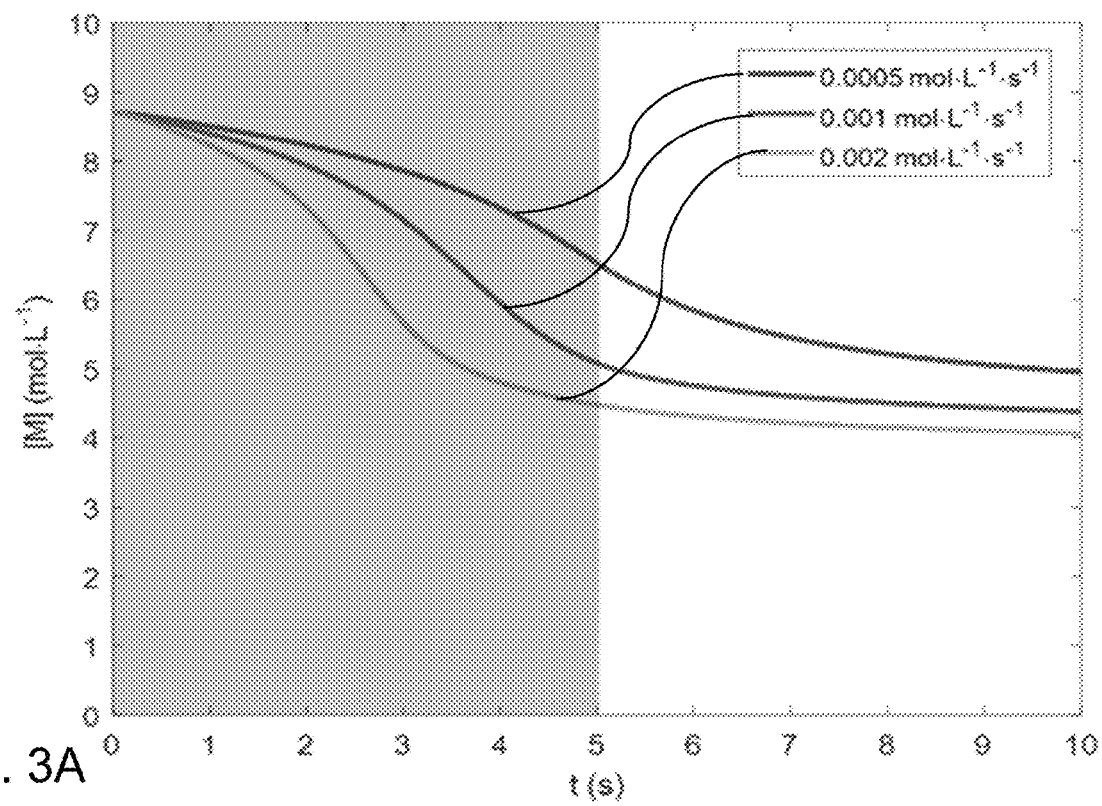
FIGS. 3A-3B show simulation results comparing photopolymerization using CW and FPP, respectively, plotting DEGDM monomer concentration versus time.
Figure 3B:
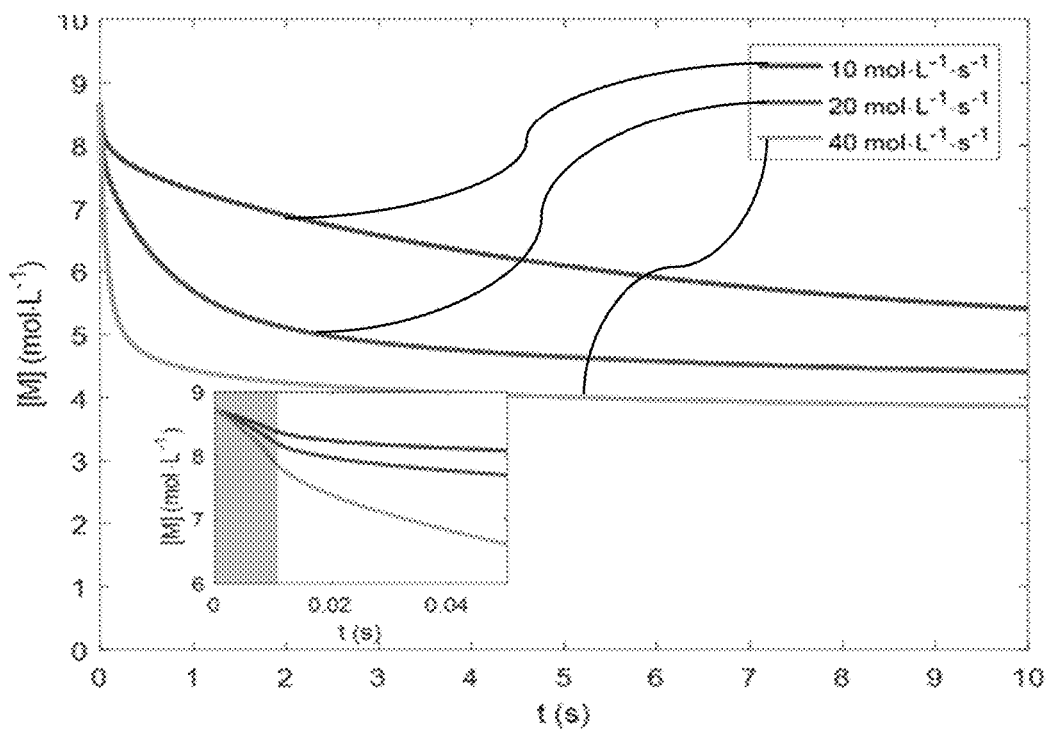

MATLAB® (MATHWORKS®) was used to perform the numerical simulation. The model described above was used to numerically solve the photopolymerization kinetic problem in two scenarios. For both scenarios, the material system is diethylene glycol dimethacrylate (DEGDMA) with a certain amount of photoinitiator. The material properties and kinetic parameters of DEGDMA have been studied previously. In the first scenario, there is a low-intensity CW exposure, which lasts for 5 seconds, resulting in a constant initiation rate during the exposure period. The initiation rate was set at 0.0005 mol·L$^{-1}$·s$^{-1}$, 0.001 mol·L$^{-1}$·s$^{-1}$, and 0.002 mol·L$^{-1}$·s$^{-1}$, respectively. The simulation result for DEGDMA monomer concentration versus time is shown in FIG. 3A. In the second scenario for flashing exposure of 10 milliseconds, a constant initiation rate during the exposure period was induced. We chose the initiation rate at 10 mol·L$^{-1}$·s$^{-1}$, 20 mol·L$^{-1}$·s$^{-1}$, and 40 mol·L$^{-1}$·s$^{-1}$, respectively. The simulation result for FPP is shown in FIG. 3B. The inset in FIG. 3B is a zoomed-in view in time scale. The gray areas in FIGS. 3A and 3B (inset) indicate the light exposure period.

From FIGS. 3A and 3B, it can be seen that both scenarios achieve a similar final conversion rate. The difference is that in the CW exposure scenario, polymerization primarily takes place during the actual light exposure period. In contrast, in the flashing exposure scenario, polymerization primarily takes place in the dark period. Thus, in the CW exposure scenario, light remains on after the material has become highly scattering; whereas in the flashing exposure scenario, the light is off before the material becomes scattering.

Three factors are involved in the optical scattering of polymers. The first factor is the size of the molecules. In a homogeneous polymer system, Rayleigh scattering is the major type of scattering. The intensity of Rayleigh scattering is proportional to the molecular weight of the polymer. The second factor is the degree of crystallinity. Some polymers form micron-size crystallites which induce strong Mie scattering. The third factor is phase separation. Typically, a polymer has porous microstructures if it is polymerized from a monomer solution in a solvent. That is because the solubility will decrease as the polymer chain grows. Thus, phase separation occurs, and the homogeneity of the system decreases, making it highly scattering.

In photopolymerization-based 3D printing, upon light exposure, the molecular weight begins to increase and scattering gradually increases. Next, the liquid-state prepolymer is solidified, and crystallites start to occur, resulting in a dramatic increase of scattering. If the prepolymer contains solvent (e.g., hydrogels), the scattering can be even greater due to phase separation. The opacification of material leads to exposure and polymerization in undesired areas, resulting in diminished resolution.

Figure 5:
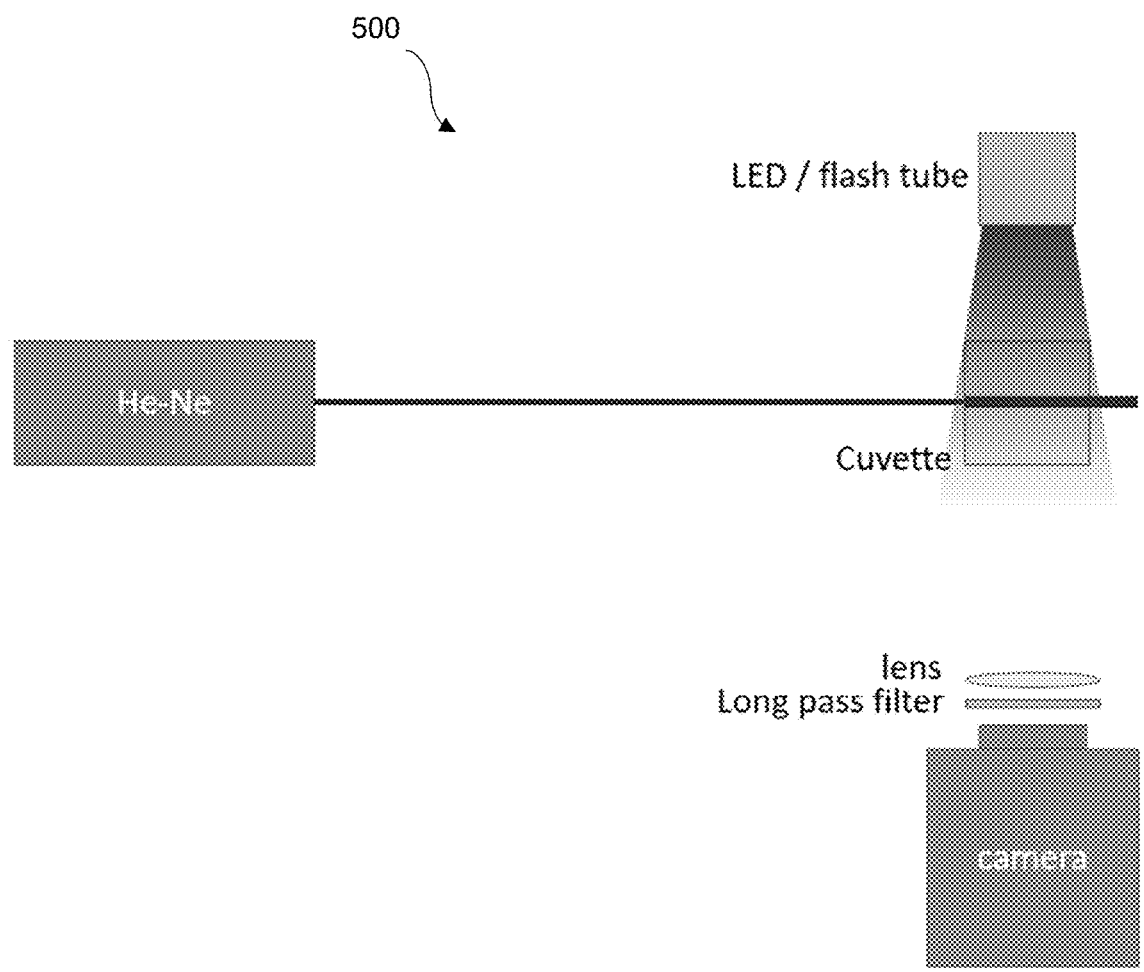
FIG. 5 shows an exemplary optical setup for visualizing opacification during polymerization.

In order to visualize the opacification during photopolymerization, the experimental set-up 500 shown in FIG. 5 was used to record the change of Tyndall effect on a photopolymerizable material. The material used was aqueous 50% (v/v) PEGDA with 4% (w/v) LAP added as the photoinitiator. The prepolymer solution was loaded into a cuvette, and a He—Ne laser beam was projected through the solution. The He—Ne laser was 30 mW at 633 nm. A UV LED light source (365 nm) or a xenon flash tube were set up near the cuvette to photopolymerize the PEGDA solution. The LED illumination had a light intensity of 12 mW cm$^{-2}$ at the cuvette. The xenon flash tube had a broad spectrum from UV to NIR; the electrical energy per flash was 40 J. A high speed camera was placed perpendicular to the laser light path to record the shape of the laser beam inside the solution at a frame rate of 500 fps and at a bit-depth of 16 bit. The high-speed camera recorded at 500 fps, 2 ms exposure time for each frame. The image was recorded at monochromatic 16-bit bit-depth, and the gray scale value ranged from 0 to 65535.

Because the actual light intensity of the flash illumination could not be directly measured, the original recorded grey scale value was used as a measure of intensity. The beginning and ending time of exposure was determined based on the subtle change of background brightness, since the long pass filter does not completely block the light from the LED or flash tube.

Figure 4A:
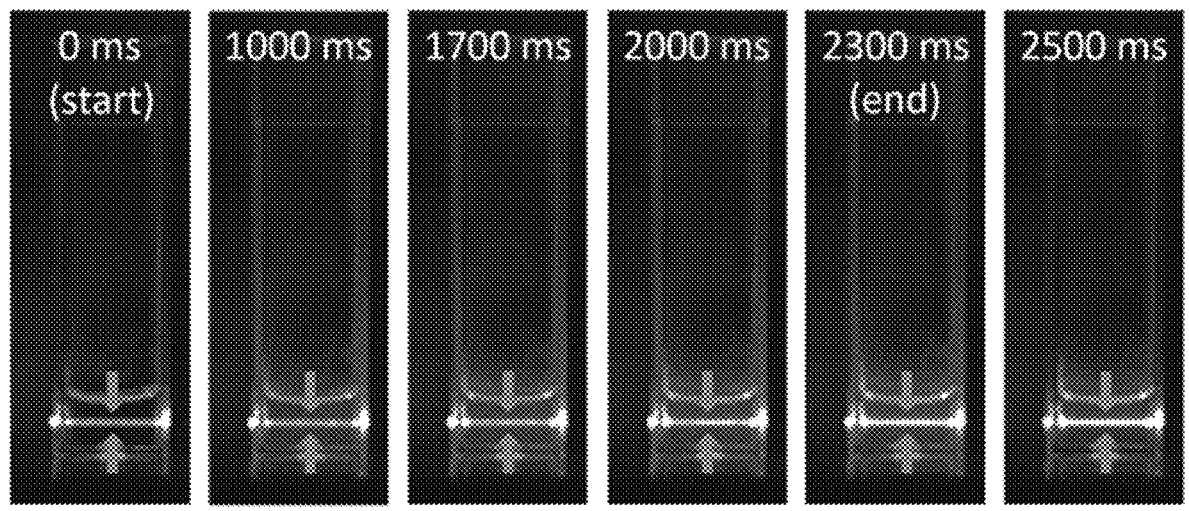
FIGS. 4A-4F illustrate scattering changes during polymerization, where
Figure 4B:
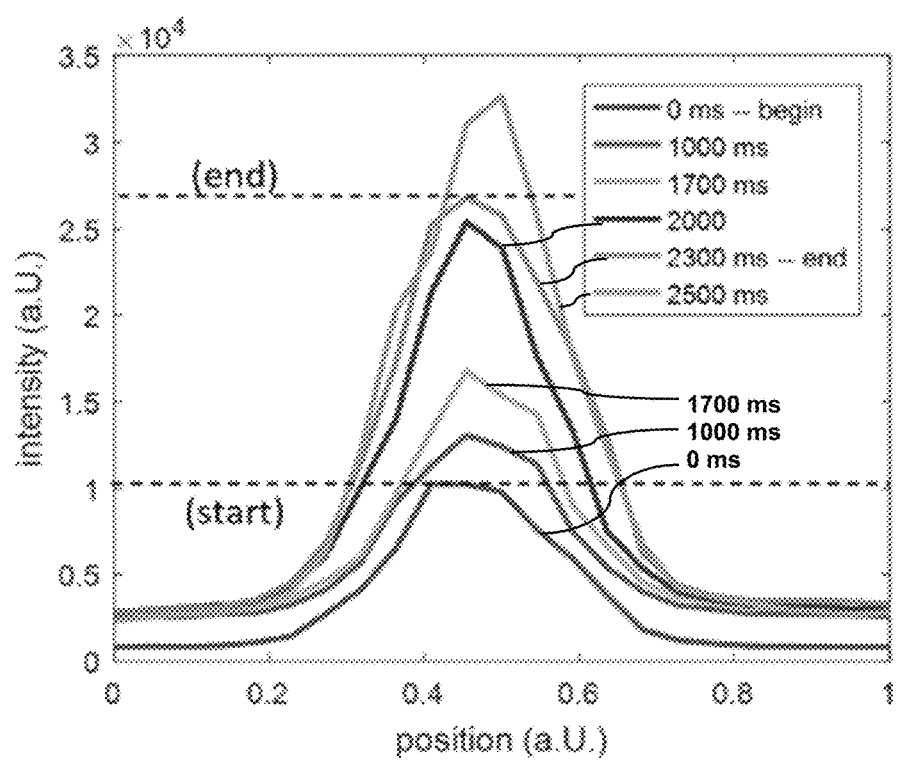
Figure 4C:
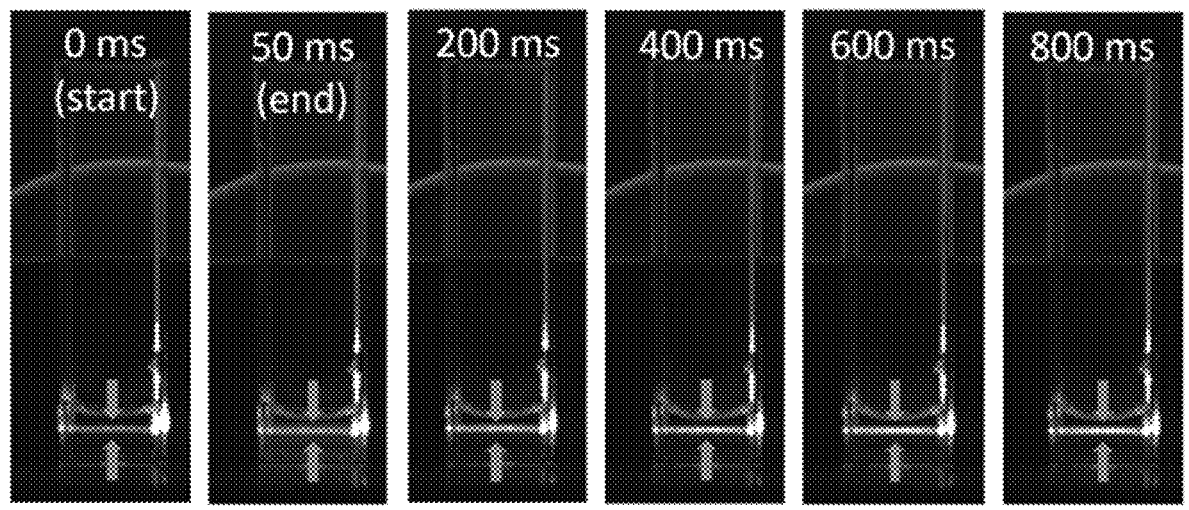
Figure 4D:
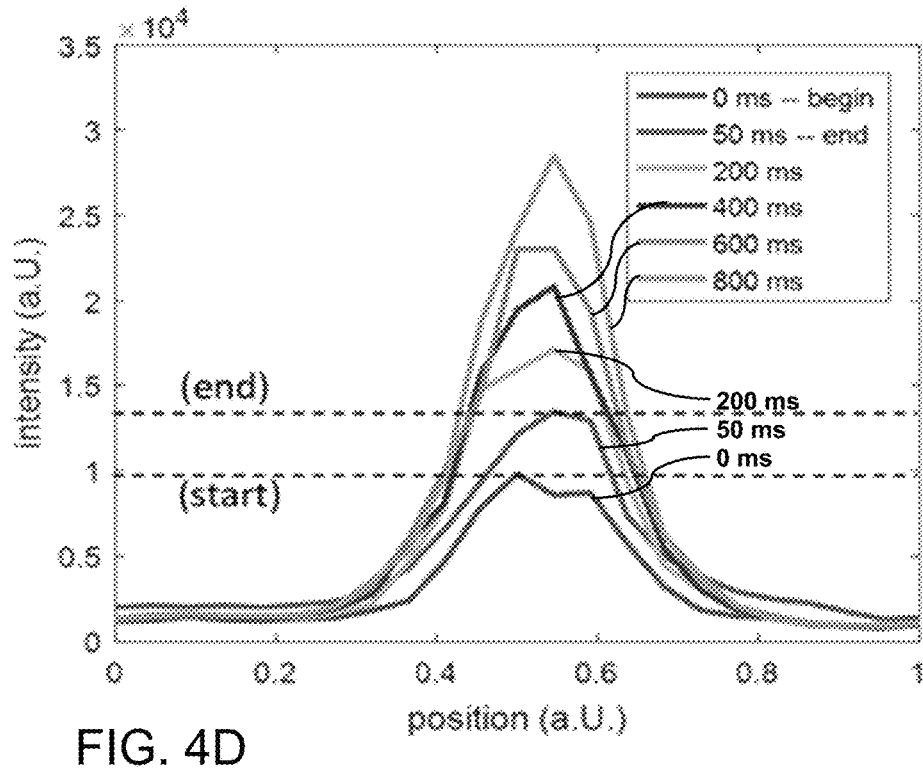

We used either a 2.3-second CW exposure from the UV LED or a single flashing exposure from the xenon flash tube to polymerize the prepolymer solution. The change of shape of the laser beam inside the PEGDA was recorded, as shown in FIG. 4A for CW exposure and in FIG. 4C for flashing exposure. The intensity profiles obtained between the gray arrows in FIGS. 4A and 4C are plotted in FIG. 4B for CW exposure and in FIG. 4D for flashing exposure, respectively.

As expected, light scattering increased during photopolymerization in both cases. In the CW exposure case, scattering gradually increased during the 2.3-second exposure, and at the end of exposure the material was already highly scattering. Scattering continued to increase slightly after exposure. In the flashing exposure case, the first 50 milliseconds of the recorded video experienced strong interference from the intense flashing, making it difficult to observe the shape of the laser beam. At the end of the flash (t=50 ms), the material scattering was only slightly increased. The scattering continued to increase in the next several hundreds of milliseconds and finally reached a similar strength of scattering as in the UV LED case. It was noted that the majority of the energy was released within the first few milliseconds. During the following several tens of milliseconds, there was merely residual discharge. Thus, we would expect even weaker scattering at the actual end of the effective flash exposure (t<10 ms). The actual flash energy required will depend on characteristics of the selected prepolymer solution and photoinitiator. Based on the disclosure herein, selection of an appropriate flash energy will be within the level of skill in the art.

A Fourier-transform infrared (FTIR) spectroscope was used to measure the infrared (IR) transmittance of the unpolymerized and polymerized samples. IR measurement was performed on Perkin Elmer Spectrum Two FTIR spectroscope. Polymerized samples were dried to eliminate the influence of the spectrum of water, first by snap-freeze using liquid nitrogen, then by lyophilization (Labonco Freezone, lyophilize at −55° C. for 3 days).

Figure 4E:
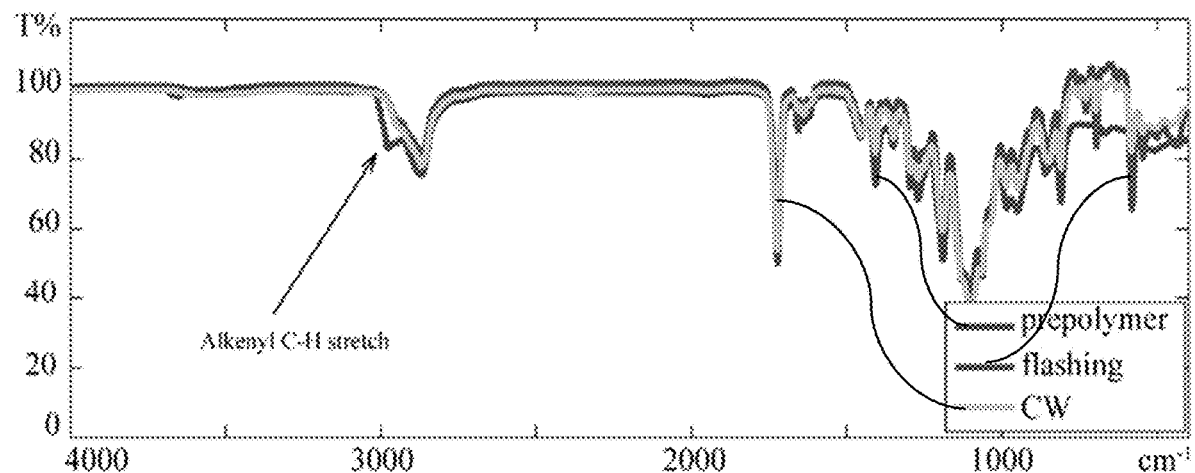

The results for the transmittance of unpolymerized pure PEGDA, polymerized sample made by a flashing exposure, and polymerized sample made by a CW exposure, are shown in FIG. 4E. The lack of alkenyl C—H stretch peak at 3000 cm$^{-1}$ in flashing and CW samples indicates that these two samples are sufficiently polymerized. Polymerized samples were lyophilized before measurement.

Three samples were prepared for the measurement in a UV-Vis-NIR spectroscope (Perkin Elmer, Lambda 1050) to measure their respective scattering properties. The prepolymer solution (50% PEGDA, 4% LAP) is loaded in a 1 mm wide glass container. The FPP sample is polymerized by a single flash (20 J) into a 1 mm slab. The CW sample is polymerized by UV LED (0.4 mW cm$^{-2}$, 10 s) into a 1 mm slab.

By using the integrating sphere, the diffusive reflectance $R_d$, total reflectance $R_t$, diffusive transmittance $T_d$, and total transmittance $T_t$ were measured. Next, collimated reflectance and collimated transmittance was calculated as $R_c=R_t-R_d$, $T_c=T_t-T_d$.

The scattering coefficients were estimated via Bouguer-Beer-Lambert Law: $I(d)=I_0\cdot(1-R_c)\cdot\exp[-(\mu_a+\mu_s)d]$.

Figure 4F:
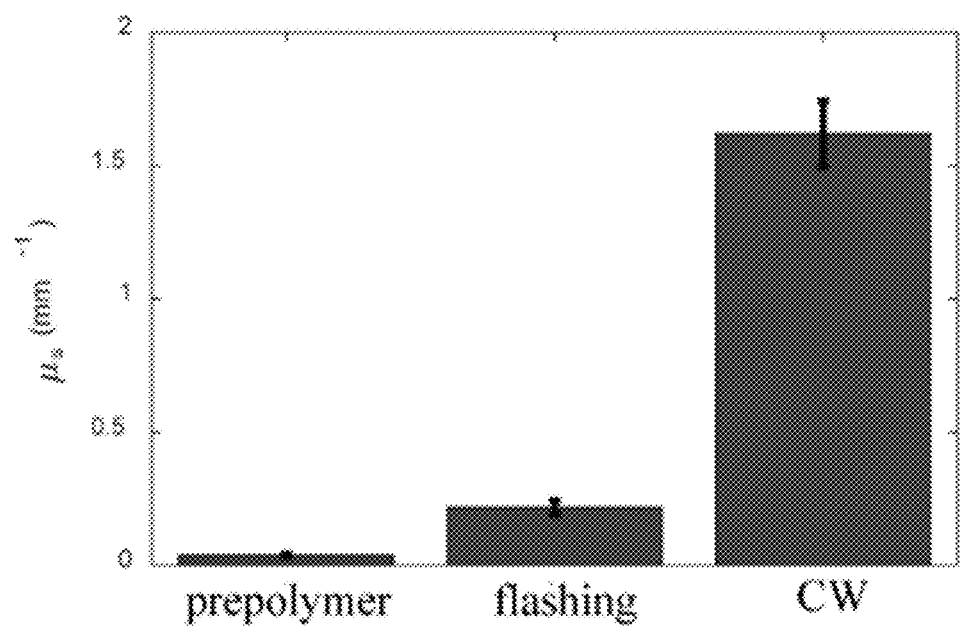
Figure 6A:
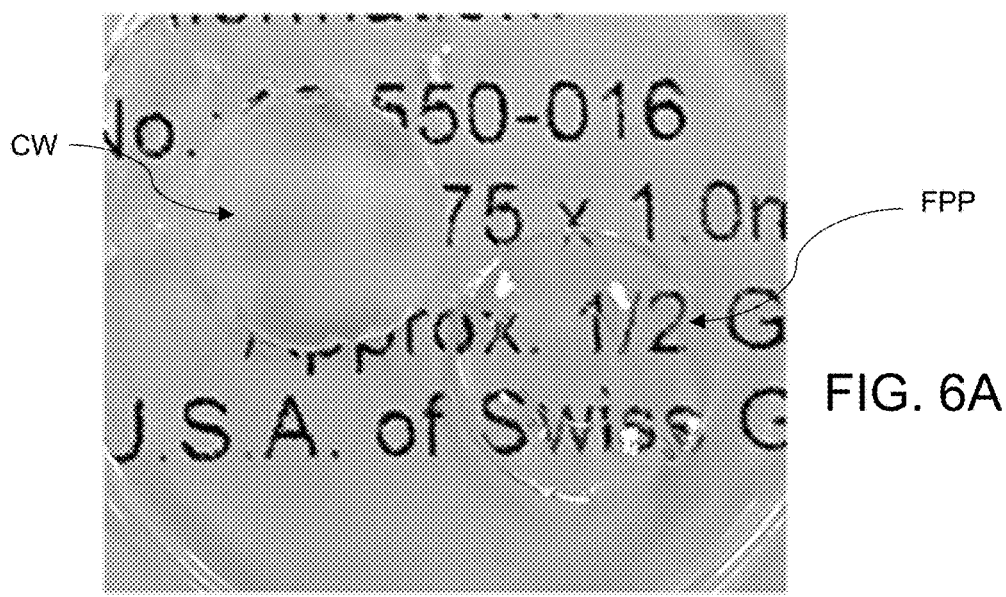
FIGS. 6A-6C are images polymer slab samples where

The total scattering of light can be estimated as $R_d+T_d=(1-R_c)[1-\exp(-\mu_s d)]$, allowing the scattering coefficient to be estimated as $\mu_s=-\ln[1-(R_d+T_d)/(1-R_c)]/d$. The results are provided in FIG. 4F, where it can be seen that the CW exposure is more likely to make the polymer highly scattering than the flashing exposure. As a baseline, the prepolymer solution has a scattering coefficient of 0.037 mm$^{-1}$ at 500 nm wavelength, i.e., minimal scattering. The visual appearance of these samples is shown in the photograph in FIG. 6A. The polymer created by the flashing exposure, seen in the lower right corner of the photo, is an optically clear slab with a scattering coefficient at 0.215 mm$^{-1}$ at 500 nm wavelength. Note that the text beneath the slab is still legible. In contrast, the polymer formed using CW exposure, seen in the upper left corner of the photo, with the underlying text illegible, is mostly opaque, with a scattering coefficient of 1.621 mm$^{-1}$ at 500 nm.

Figure 6B:
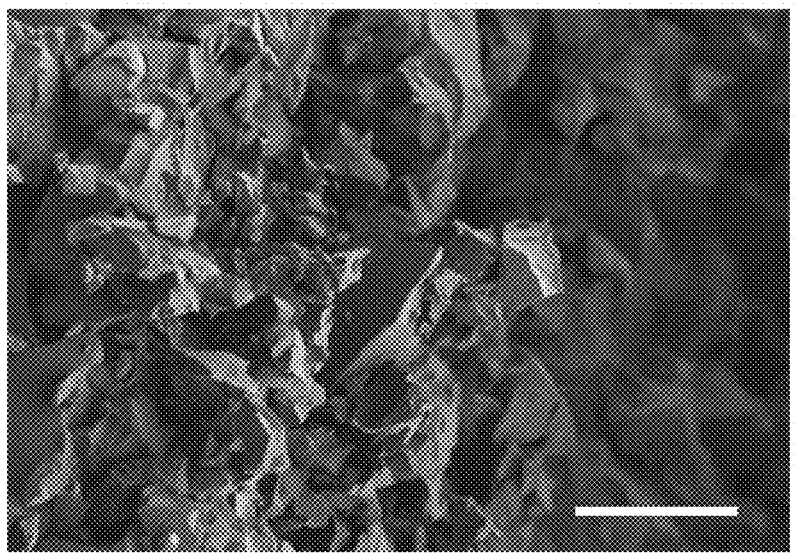
Figure 6C:
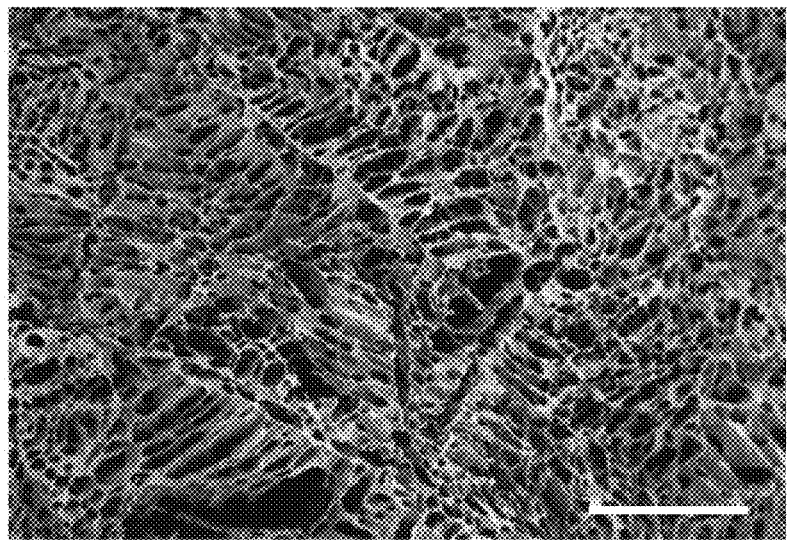

FIGS. 6B and 6C are SEM photomicrographs of the polymer slabs that were formed using CW and flashing exposures, respectively. In each image the scale bar is 100 μm. The samples were prepared for SEM imaging by snap-freezing using liquid nitrogen, dried by lyophilization, and sputter-coated with Iridium. This process removed the water without destroying the microstructure of the samples. A Zeiss Sigma 500 SEM was used to take the images.

The flashing photopolymerization scheme described herein provides for photopolymerization-based 3D printing with improved precision. By using a flashing exposure, the material remains optically clear during the exposure period so that light scattering is minimized, resulting in control of the exposure to produce fine fabrication resolution. Both theoretical analysis and experimental demonstration have revealed the different scattering effects in CW and flashing exposures. These results demonstrate that by chronologically managing the light exposure, polymerization and opacification can be controlled to greatly improve the fidelity of 3D-printed structures. This capability is particularly important for microscale 3D printing where the scattering effect has significant impact on the microstructure formation. The improved technique can be applied to any field requiring high-resolution, micron-scale 3D fabrication, including, but not limited to, microelectromechanical systems, microfluidics, tissue engineering, and biomedical devices.

REFERENCES—INCORPORATED HEREIN BY REFERENCE

[1] J. R. Tumbleston, et al., "Continuous liquid interface production of 3D objects", *Science.* 347 (2015) 1349-1352. doi:10.1126/science.aaa2397.

[2] C. Sun, et al., "Projection micro-stereolithography using digital micro-mirror dynamic mask", *Sensors and Actuators A: Physical.* 121 (2005) 113-120. doi:10.1016/j.sna.2004.12.011.

[3] R. Gauvin, et al., "Microfabrication of complex porous tissue engineering scaffolds using 3D projection stereolithography", *Biomaterials.* 33 (2012) 3824-3834. doi:10.1016/j.biomaterials.2012.01.048.

[4] L.-H. Han, et al., "Fluorinated Colloidal Emulsion of Photochangeable Rheological Behavior as a Sacrificial Agent to Fabricate Organic, Three-Dimensional Microstructures", *Langmuir.* 26 (2010) 6108-6110. doi:10.1021/la100014k.

[5] A. P. Zhang, et al., "Rapid Fabrication of Complex 3D Extracellular Microenvironments by Dynamic Optical Projection Stereolithography", *Advanced Materials.* 24 (2012) 4266-4270. doi:10.1002/adma.201202024.

[6] W. Zhu, et al., "3D printing of functional biomaterials for tissue engineering", *Current Opinion in Biotechnology.* 40 (2016) 103-112.

[7] W. Zhu, et al., "Rapid continuous 3D printing of customizable peripheral nerve guidance conduits", *Materials Today.* (2018).

[8] D. B. Berry, et al., "A 3D tissue-printing approach for validation of diffusion tensor imaging in skeletal muscle", *Tissue Engineering Part A.* 23 (2017) 980-988.

[9] W. Zhu, et al., "Direct 3D bioprinting of prevascularized tissue constructs with complex microarchitecture", *Biomaterials.* 124 (2017) 106-115. doi:10.1016/j.biomaterials.2017.01.042.

[10] X. Qu, et al., "Relative impact of uniaxial alignment vs. form-induced stress on differentiation of human adipose derived stem cells", *Biomaterials.* 34 (2013) 9812-9818. doi:10.1016/j.biomaterials.2013.09.009.

[11] J.-F. Xing, et al., "Two-photon polymerization microfabrication of hydrogels: an advanced 3D printing technology for tissue engineering and drug delivery", *Chemical Society Reviews.* 44 (2015) 5031-5039. doi:10.1039/C5CS00278H.

[12] H. N. Chia, et al., "Recent advances in 3D printing of biomaterials", *Journal of Biological Engineering.* 9 (2015) 4. doi:10.1186/s13036-015-0001-4.

[13] T. E. Brown, et al., "Spatiotemporal hydrogel biomaterials for regenerative medicine", *Chemical Society Reviews.* 46 (2017) 6532-6552. doi: 10.1039/C7CS00445A.

[14] P. Soman, et al., "A three-dimensional polymer scaffolding material exhibiting a zero Poisson's ratio", *Soft Matter.* 8 (2012) 4946. doi:10.1039/c2sm07354d.

[15] P. Soman, et al., "Spatial tuning of negative and positive Poisson's ratio in a multi-layer scaffold", *Acta Biomaterialia.* 8 (2012) 2587-2594.

[16] C. E. Carraher Jr, *Introduction to polymer chemistry*, CRC Press, 2017.

[17] J. M. G. Cowie, et al., *Polymers: chemistry and physics of modern materials*, CRC Press, 2007.

[18] T. Scherzer, et al., "Real-time FTIR-ATR spectroscopy to study the kinetics of ultrafast photopolymerization reactions induced by monochromatic UV light", *Vibrational Spectroscopy.* 19 (1999) 385-398.

[19] C. N. Bowman, et al., "Toward an enhanced understanding and implementation of photopolymerization reactions", *AIChE Journal.* 54 (2008) 2775-2795. doi: 10.1002/aic.11678.

[20] M. D. Goodner, et al., "Method for determining the kinetic parameters in diffusion-controlled free-radical homopolymerizations", *Industrial & Engineering Chemistry Research.* 36 (1997) 1247-1252.

[21] M. D. Goodner, et al., "Modeling primary radical termination and its effects on autoacceleration in photopolymerization kinetics", *Macromolecules.* 32 (1999) 6552-6559.

[22] M. R. Gleeson, et al., "Nonlocal photopolymerization kinetics including multiple termination mechanisms and dark reactions—Part I Modeling", *Journal of the Optical Society of America B.* 26 (2009) 1736. doi:10.1364/JOSAB.26.001736.

[23] M. D. Goodner, et al., "Development of a comprehensive free radical photopolymerization model incorporating heat and mass transfer effects in thick films", *Chemical Engineering Science.* 57 (2002) 887-900. doi:10.1016/S0009-2509(01)00287-1.

[24] J.-C. Auger, et al., "Scattering efficiency of clusters composed by aggregated spheres", *Journal of Quantitative Spectroscopy and Radiative Transfer.* 79-80 (2003) 521-531. doi:10.1016/50022-4073(02)00305-9.

[25] A. Seeboth, et al., "Phase transitions and phase separations in aqueous polyether systems", *Colloid Polym Sci.* 279 (2001) 696-704. doi:10.1007/s003960000474.

[26] V. Tuchin, *Tissue optics: light scattering methods and instruments for medical diagnosis*, SPIE Press, 2007.

[27] B. D. Fairbanks, et al., "Photoinitiated polymerization of PEG-diacrylate with lithium phenyl-2,4,6-trimethylbenzoylphosphinate: polymerization rate and cytocompatibility", *Biomaterials.* 30 (2009) 6702-6707. doi:10.1016/j.biomaterials.2009.08.055.

The invention claimed is:

1. A method for micro-scale 3D printing of an object, comprising:

providing a 3D printer having an optical pathway configured for projecting modulated photopolymerizing light from a pulsed light source into a pre-polymer solution within a printing volume defined between a substrate and a movable platform disposed within the solution;

activating the pulsed light source to emit a single flash of polymerizing energy into the optical pathway to initiate polymerization of the solution within the printing volume to print a first layer of the object;

moving the platform to define a new printing volume and activating the pulsed light source to emit another single flash of polymerizing energy to initiate polymerization of the solution within the new printing volume to print a next layer of the object; and repeating the step of moving the platform and activating the pulsed light source for a plurality of iterations to form a plurality of layers, wherein each iteration generates a single layer, so that the object is fabricated layer-by-layer until finished;

wherein each single flash has a flash duration that terminates prior to opacification of the solution so that polymerization and opacification of each layer occurs in an absence of light.

2. The method of claim 1, wherein the 3D printer comprises a digital micro-mirror device (DMD) configured to modulate the photopolymerizing light with a photomask image corresponding to each layer of the object.

3. The method of claim 1, wherein the printing volume has a thickness within a range of from 1 and 500 microns.

4. The method of claim 1, wherein the substrate is a transparent anti-adhesion substrate through which the photopolymerizing light is projected.

5. The method of claim 1, wherein the pulsed light source is a flash tube or a pulsed laser.

6. The method of claim 1, wherein moving the platform comprises incrementally separating the substrate and the platform by a separation of from 1 and 500 microns.

7. The method of claim 1, wherein moving the platform comprises continuously separating the substrate and the platform, wherein the pulsed light source is activated at each separation of from 1 and 500 microns.

8. The method of claim 1, wherein the flash duration is in a range of 1 femtosecond to 50 ms.

9. The method of claim 1, wherein the flash duration is configured to avoid light scattering within the solution.

10. The method of claim 1, wherein each single flash has a peak power from 20W to $10^{15}$ W.

11. A method for micro-scale 3D printing of an object, comprising:

using a first photomask, modulating a first flash of light from a polymerizing light source projected along an optical path to initiate photopolymerization of a first volume of pre-polymer solution to form a first layer of the object on a platform disposed within the solution, wherein the first volume is defined between a transparent substrate and the platform;

moving the platform away from the transparent substrate to define a second volume of pre-polymer solution;

in response to movement of the platform by a predetermined distance, modulating a second flash of light with a second photomask to initiate photopolymerization of the second volume to form a second layer of the object; and repeating the steps of moving and modulating with each of a plurality of additional photomasks to form a plurality of additional layers to construct the object layer-by-layer until finished;

wherein each of the first flash and second flash has a flash duration that terminates prior to opacification of the pre-polymer solution so that polymerization and opacification of each volume of the pre-polymer solution occurs in an absence of light.

12. The method of claim 11, wherein movement of the platform is continuous or incremented, wherein the second flash is initiated when the platform has moved the predetermined distance.

13. The method of claim 11, wherein the predetermined distance is from 1 and 500 microns.

14. The method of claim 11, wherein the 3D printer comprises a digital micro-mirror device (DMD) and a control unit, wherein the control unit is configured to manipulate the DMD to project each of the first photomask, the second photomask, and the plurality of additional photomasks to construct each layer of the object.

15. The method of claim 11, wherein the substrate is a transparent anti-adhesion substrate through which the light is projected.

16. The method of claim 11, wherein the polymerizing light source is a flash tube or a pulsed laser.

17. The method of claim 11, wherein each of the first flash and the second flash has a flash duration in a range of 1 femtosecond to 50 ms.

18. The method of claim 11, wherein each of the first flash and the second flash has a flash duration configured to avoid light scattering within the solution.

19. The method of claim 11, wherein each of the first flash and the second flash has a peak power from 20W to $10^{15}$ W.

20. A micro-scale 3D printer for printing an object, comprising:

a container configured to retaining a pre-polymer solution, the container having a transparent substrate;

a movable platform disposed within the solution and separated from the substrate by a separation, wherein the separation defines a printing volume;

a pulsed light source configured to project a flash of photopolymerizing light along an optical path toward the printing volume;

a light modulator configured for modulating the photopolymerizing light with a series of photomasks corresponding to layers of the object; and a control unit configured for:
activating the pulsed light source to emit a single flash to initiate polymerization of a first layer of the object;
moving the movable platform to increase the separation by a predetermined spacing;
activating the pulsed light to emit another single flash to initiate polymerization of a next layer of the object; and
repeating the moving and activating for a plurality of iterations to print a plurality of layers corresponding to the series of photomasks until the object is finished;

wherein each single flash has a flash duration that terminates prior to opacification of the solution so that polymerization and opacification of each layer occurs in an absence of light.

21. The printer of claim 20, wherein the light modulator comprises a digital micro-mirror device (DMD).

22. The printer of claim 20, wherein the printing volume has a thickness within a range of from 1 and 500 microns.

23. The printer of claim 20, wherein the transparent substrate has an anti-adhesion surface.

24. The printer of claim 20, wherein the pulsed light source is a flash tube or a pulsed laser.

25. The printer of claim 20, wherein the predetermined spacing of the separation is from 1 and 500 microns.

26. The printer of claim 20, wherein the flash duration is in a range of 1 femtosecond to 50 ms.

27. The printer of claim 26, wherein the flash duration is selected to substantially avoid light scattering within the solution.

28. The printer of claim 20, wherein the single flash has a peak power from 20W to $10^{15}$ W.

* * * * *